(12) United States Patent
Madhavan et al.

(10) Patent No.: US 8,910,275 B2
(45) Date of Patent: Dec. 9, 2014

(54) NETWORK MONITORING

(75) Inventors: Sajeev Madhavan, Roseville, CA (US); Mauricio Sanchez, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2431 days.

(21) Appl. No.: 11/705,963

(22) Filed: Feb. 14, 2007

(65) Prior Publication Data

US 2008/0196100 A1 Aug. 14, 2008

(51) Int. Cl.
*G06F 11/00* (2006.01)
*G06F 11/30* (2006.01)
*H04L 29/06* (2006.01)

(52) U.S. Cl.
CPC .......... *H04L 63/1408* (2013.01); *H01L 63/145* (2013.01)
USPC ................................................ 726/22; 73/188

(58) Field of Classification Search
CPC ................................ G05F 21/55; G05F 21/566
See application file for complete search history.

(56) References Cited

U.S. PATENT DOCUMENTS

| | | | |
|---|---|---|---|
| 5,949,785 A * | 9/1999 | Beasley | 370/398 |
| 6,401,210 B1 | 6/2002 | Templeton | |
| 7,096,498 B2 | 8/2006 | Judge | |
| 7,581,249 B2 * | 8/2009 | Bussiere et al. | 726/22 |
| 7,613,837 B2 * | 11/2009 | Gordy et al. | 709/250 |
| 7,657,939 B2 * | 2/2010 | Strauss et al. | 726/23 |
| 7,835,358 B2 * | 11/2010 | Gallatin et al. | 370/390 |
| 7,860,006 B1 * | 12/2010 | Kashyap et al. | 370/235 |
| 7,941,855 B2 * | 5/2011 | Sung et al. | 726/23 |
| 7,954,160 B2 * | 5/2011 | Strauss et al. | 726/23 |
| 8,225,399 B1 * | 7/2012 | Van der Merwe | 726/23 |
| 8,248,946 B2 * | 8/2012 | Chao et al. | 370/235.1 |
| 2003/0051026 A1 * | 3/2003 | Carter et al. | 709/224 |
| 2004/0148520 A1 * | 7/2004 | Talpade et al. | 713/201 |
| 2004/0260945 A1 | 12/2004 | Raikar et al. | |
| 2005/0216770 A1 * | 9/2005 | Rowett et al. | 713/201 |
| 2006/0174342 A1 * | 8/2006 | Zaheer et al. | 726/23 |
| 2006/0212572 A1 * | 9/2006 | Afek et al. | 709/225 |
| 2007/0056020 A1 * | 3/2007 | Ward | 726/3 |
| 2007/0056038 A1 * | 3/2007 | Lok | 726/23 |
| 2007/0177615 A1 * | 8/2007 | Miliefsky | 370/401 |
| 2007/0280222 A1 * | 12/2007 | Smith et al. | 370/360 |
| 2008/0005782 A1 * | 1/2008 | Aziz | 726/3 |
| 2008/0025229 A1 * | 1/2008 | Beliles et al. | 370/245 |
| 2008/0212579 A1 * | 9/2008 | LaVigne et al. | 370/389 |
| 2010/0039955 A1 * | 2/2010 | Taylor et al. | 370/252 |

\* cited by examiner

*Primary Examiner* — Dede Zecher
*Assistant Examiner* — Abdullah Almamun

(57) ABSTRACT

Network devices, systems, and methods are described that cause a particular port on a first network device to send data packets from the particular port on the first network device to an intrusion system (IS) on a second network device.

20 Claims, 3 Drawing Sheets

NETWORK MONITORING

BACKGROUND

Computing networks can include multiple network devices such as routers, switches, hubs, servers, desktop PCs, laptops, and workstations, and peripheral devices, e.g., printers, facsimile devices, and scanners, networked together across a local area network (LAN) and/or wide area network (WAN).

Networks can include an intrusion system (IS), e.g., an intrusion prevention system (IPS) and/or intrusion detection system (IDS), that serves to detect unwanted intrusions/activities to the computer network. Unwanted network intrusions/activities may take the form of attacks through computer viruses and/or hackers, among others, trying to access the network. To this end, an IS can identify different types of suspicious network traffic and network device usage that can not be detected by a conventional firewall. Thus an IS may identify network attacks against vulnerable services, data driven attacks on applications, host based attacks such as privilege escalation, denial of service attacks, port scans, unauthorized logins and access to sensitive files, viruses, Trojan horses, and worms, among others.

In previous approaches, to identify network traffic of interest, data traffic needs to pass through a point of the network where an IS is located. Typically this would be a port on a switch. That is, an IS may be connected to a port on a network device such as a switch, router, etc., so that the IS can identify suspicious network traffic passing through that network device. If an IS is not connected in-line with or on a particular network device, attacks passing through that network device cannot be detected. In previous approaches, to detect such suspicious network traffic, each port of the network would have to have an IS. For large network systems, however, having an IS at each port can be both very expensive to implement and very complex to maintain.

DETAILED DESCRIPTION

Various embodiments of the invention include network devices, systems, and methods, including executable instructions, to monitor ports on a network. The embodiments include one or more intrusion systems (IS). As used herein "IS" is used to indicate intrusion system(s), i.e., both the singular and plural. When a threat mitigation engine (TME) is alerted to a data traffic anomaly (or anomalies), instructions execute to identify which network device and particular port and/or ports is experiencing the data traffic anomaly. Computer executable instructions storable in the memory and executable by the processor of the network device send a sample of a data flow through ports of the network device to the TME from which the particular port is determined by the TME. Instructions can be executed to reconfigure the particular port to provide data packets to an IS located elsewhere in the network. In this way, certain embodiments of the present disclosure may allow for fewer IS, e.g., one or two IS, to be used to protect ports on the network as compared to previous approaches.

As used herein, a "network" means a communication system that links two or more computers and peripheral devices and allows users to access resources on other computers and exchange messages with other users. A network may allow users to share resources on their own systems with other network users and to access information on centrally located systems or systems that are located at remote offices. A network may provide connections to the Internet or to the networks of other organizations. Users may interact with network-enabled software applications to make a network request, such as to get a file or print on a network printer. Applications may also communicate with network management software, which can interact with network hardware to transmit information between devices on the network.

A local area network ("LAN") is a network that is located in a relatively small physical area, such as a building, in which computers and other network devices are linked, usually via a wiring-based cabling scheme. A LAN typically includes a shared medium to which workstations (e.g., client network devices) attach and through which they communicate. LANs often use broadcasting methods for data communication, whereby a device on the LAN can transmit a message that other devices on the LAN then "listen" to. However, the device or devices to which the message is addressed actually receive the message. Data is typically packaged into frames for transmission on the LAN.

Figure 1:
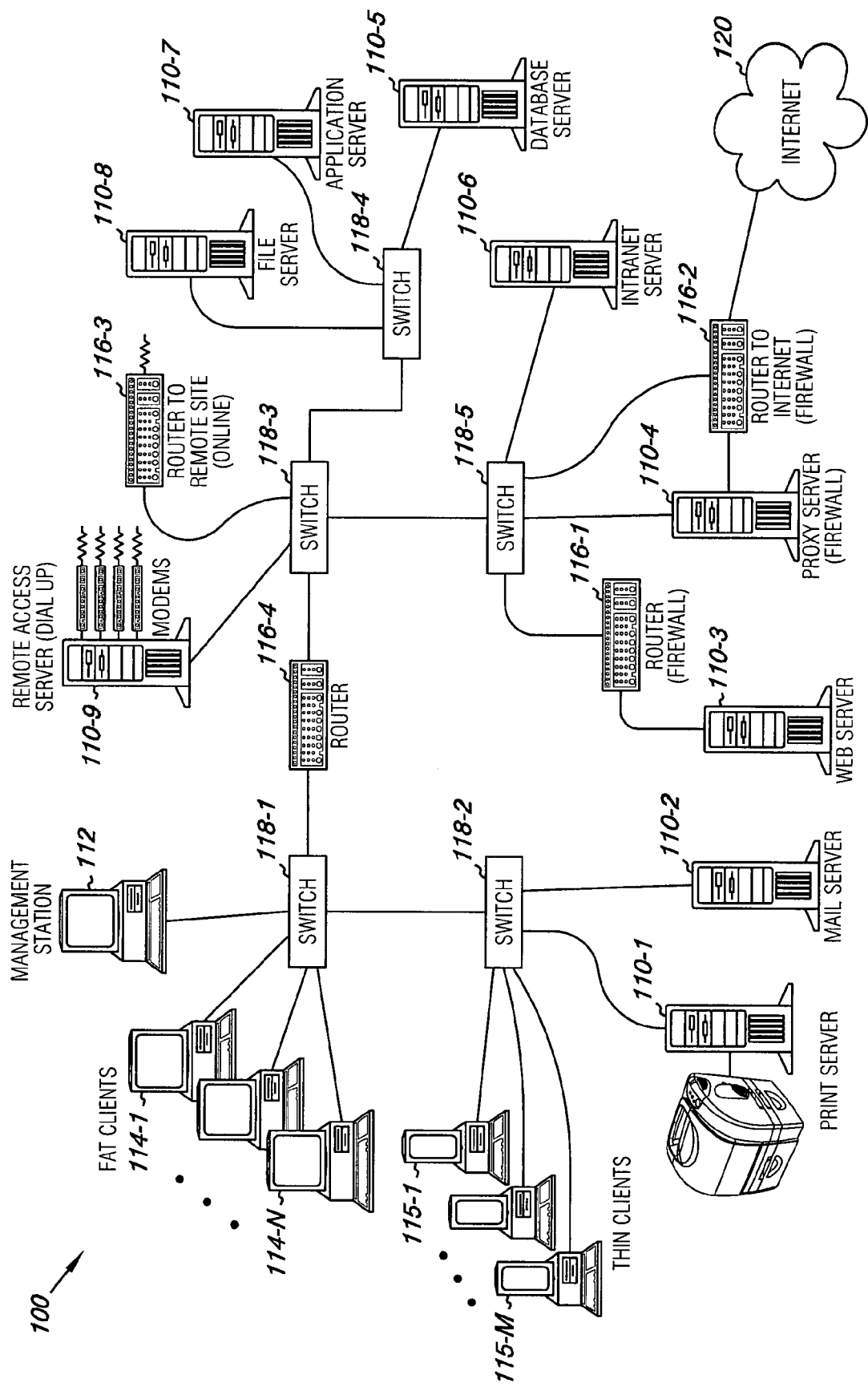
FIG. 1 is an example of a computing device network in which intrusion system embodiments can be implemented.

FIG. 1 is an embodiment of a computing device network 100. As shown in FIG. 1, a number of devices, e.g., PCs, servers, peripherals, etc., can be networked together via a LAN and/or WAN via routers, hubs, switches, and the like. As used herein a "network device" means a switch, router, hub, bridge, etc., i.e., a device having processor and memory resources and connected to a network 100, as the same will be understood by one of ordinary skill in the art. Although the term switch will often be used in this disclosure, those skilled in the art will realize that embodiments may be implemented with other network devices. As the reader will appreciate, the term network device can also be used to refer to servers, PCs, etc., as illustrated further below.

The embodiment of FIG. 1 illustrates clients and servers in a LAN. The example network of FIG. 1 illustrates a print server 110-1 to handle print jobs for the network 100, a mail server 110-2, a web server 110-3, a proxy server (firewall) 110-4, a database server 110-5, an intranet server 110-6, an application server 110-7, a file server 110-8, and a remote access server (dial up) 110-9. The examples described here do not provide an exhaustive list of servers that may be used in a network.

The embodiment of FIG. 1 further illustrates a network management station 112, e.g., server, PC, and/or workstation, a number of "fat" clients 114-1, ... , 114-N which can also include PCs and workstations and/or laptops, and a number of "thin" clients 115-1, ... , 115-M. As used herein a "thin client" can refer to a computing device that performs little or no application processing and functions more as an input/output terminal. That is, in this example, a thin client generally relies on the application processing being performed on a server networked thereto. Additionally, a thin client can include a client in a server/client relationship which has little or no storage, as the same will be understood by one of ordinary skill in the art. In contrast, a "fat client" is generally equipped with processor and memory resources, to perform larger application processing and/or storage.

The designators "N" and "M" are used to indicate that a number of fat or thin clients can be attached to the network 100. The number that N represents can be the same or different from the number represented by M. The embodiment of FIG. 1 illustrates that these examples network devices can be connected to one another and/or to other networks via routers, 116-1, 116-2, 116-3, 116-4, hubs, and/or switches 118-1, 118-2, 118-3, 118-4, 118-5, as the same are known and understood by one of ordinary skill in the art. The term "network" as user herein is not limited to the number and/or type of network devices illustrated in FIG. 1.

As one of ordinary skill in the art will appreciate, many of the network devices (e.g., switches 118-1, 118-2, 118-3, 118-4, 118-5 and/or hubs) can include a processor in communication with a memory and will include network chips having a number of network ports. By way of example and not by way of limitation, the network management station 112 includes a processor and memory. Similarly, network devices such as routers, 116-1, 116-2, 116-3, 116-4, hubs, and/or switches 118-1, 118-2, 118-3, 118-4, 118-5 may include processor and memory resources, along with network chips having hardware logic or application specific integrated circuits (ASICs) associated with ports. Embodiments of the various devices in the network are not limited to a number, type, or size of processor or memory resources.

Program instructions (e.g., computer executable instructions), as described in more detail herein, can reside on the various network devices. For example, program instructions in the form of firmware and/or software can be resident on the network 100 in the memory of a network management station 112 and/or one or more routers, 116-1, 116-2, 116-3, 116-4, hubs, and/or switches 118-1, 118-2, 118-3, 118-4, 118-5, and can be executable by the processor(s) and/or logic (e.g., hardware in the form of transistor gates) thereon. Also, program instructions can be resident in a number of locations on various network devices in the network 100 as can be employed in a distributed computing network. According to embodiments a "distributed computing network" means the use of multiple computing devices in a network to execute various roles in executing instructions, e.g., application processing, etc., as described above. "Software", as used herein, includes a series of executable instructions that can be stored in memory and executed by the hardware logic of a processor (e.g., transistor gates) to perform a particular task. Memory, as the reader will appreciate, can include random access memory (RAM), read only memory (ROM), non-volatile memory (such as Flash memory), etc. More description for the same is not provided here so as not to obscure embodiments of the invention.

As one of ordinary skill in the art will appreciate, each network device in the network 100 can be physically associated with a port of a switch to which it is connected. Data packets pass through the network. Users physically connect to the network through these ports. Data frames, or packets, can be transferred between network devices by means of a switch's logic link control (LLC)/media access control (MAC) circuitry, or "engines", associated with ports on a network device, e.g., switch. A network switch forwards data frames received from a transmitting network device to a destination network device based on the header information in received data packets. The switch can also forward packets from a given network to other networks through ports on one or more other switches.

As discussed herein, networks can include an intrusion system (IS) that serves to detect and/or evaluate suspicious activity on the computer network. In previous approaches an IS would be placed on network devices having ports through which most of the network data traffic passed. To protect edge ports, i.e., ports on edge network devices, the IS would have to be located with edge network devices. As used herein, the term "edge network device" means a network device which connects directly to network clients, fat or thin. For example, in FIG. 1 network device 118-1, e.g., switch 118-1, connects directly with network clients 114-1, . . . , 114-N, and edge network device 118-2, e.g., switch 118-2, connects directly with network clients 115-1, . . . , 115-N. As such, switch 118-1 and/or switch 118-2 can be considered as an edge network device having a number of "edge ports". As used herein, the term "edge ports" means ports on an edge network device. In this approach many IS would have to be deployed in the network.

IS can be provided as a program or routine, i.e., executable instructions, stored in memory and executed on a processor or by logic in association with a network device. The IS serves to detect suspicious activity, such as denial of service attacks, port scans and attempts to manipulate network devices, by examining network traffic associated with multiple network devices. An IS may do so by reading the incoming and outgoing data packets from a port and performing analyses to identify suspicious data and/or traffic patterns. In some embodiments, when the IS becomes aware of a potential security breach, it logs the information and signals an alert. An IS can also respond to suspicious activity by resetting a connection or by programming a firewall to block network traffic from the suspicious source. In various IS this may happen automatically or at the command of an operator.

IS are not limited to inspecting incoming network traffic. Ongoing intrusions can be learned from outgoing or local traffic as well. Some undesirable activity can even be staged from the inside of a network or network segment, and hence the suspicious activity may not be incoming traffic at all. An IS may watch for suspicious activity by examining network communications, identifying heuristics and patterns (often known as signatures) of known suspicious activity types, and providing an alert when they occur.

Previously to fully cover a network an IS would have to be located with each edge network device, effectively covering edge ports, where a user on a network client, fat or thin, connects in the network. An IS at these edge ports could similarly perform the actions described above. In such a previous approach, each edge network device would need an IS statically positioned for monitoring network data traffic through the edge ports. For large network systems, however, having an IS at each edge network device to cover its ports can be both very expensive to establish and very complex to maintain.

Embodiments of the present disclosure, in contrast, provide for network devices, systems, and methods, including executable instructions, to monitor ports on a network for an occurrence of data traffic of interest, e.g., data traffic anomalies. When a data traffic anomaly (or anomalies) is discovered an alert signal is triggered. The alert signal issues to a threat mitigation engine (TME), as the same will be known and understood by one of ordinary skill in the art, in which instructions execute to identify which network device and particular port and/or ports is experiencing the data traffic anomaly. According to embodiments, instructions can be executed to reconfigure the particular port to provide data packets from the particular port, or port(s), to an IS located elsewhere in the network.

According to some embodiments, network devices being monitored do not each include an IS. That is, rather than having an IS at each of the network devices, or achieving less than full network coverage, embodiments of the present disclosure provide an IS at a selected location, or locations, which can be used to assess data traffic anomalies associated with packets that are not passing through ports on the network device having the IS.

As one of ordinary skill in the art will understand, embodiments of the present disclosure can be performed by software (as the same has been described above), hardware in the form of logic, and/or application modules (i.e., a self-contained hardware or software components that interacts with a larger system) on the systems and devices shown herein or otherwise. As the reader will appreciate a software module may come in the form of a file and handle a specific task within a larger software system. A hardware module may be a separate set of logic, e.g., transistor/circuitry gates, that "plug-in" as a card, appliance, or otherwise, to a larger system/device. Embodiments, described herein, are not limited to a particular operating environment or to executable instructions composed in a particular programming language or syntax. Instructions suitable for carrying out embodiments of the present disclosure can be resident in one or more devices or locations or in several and even many locations.

Unless explicitly stated, method embodiments described herein are not constrained to a particular order or sequence. Additionally, some of the described method embodiments may occur or be performed at the same point in time.

Figure 2:
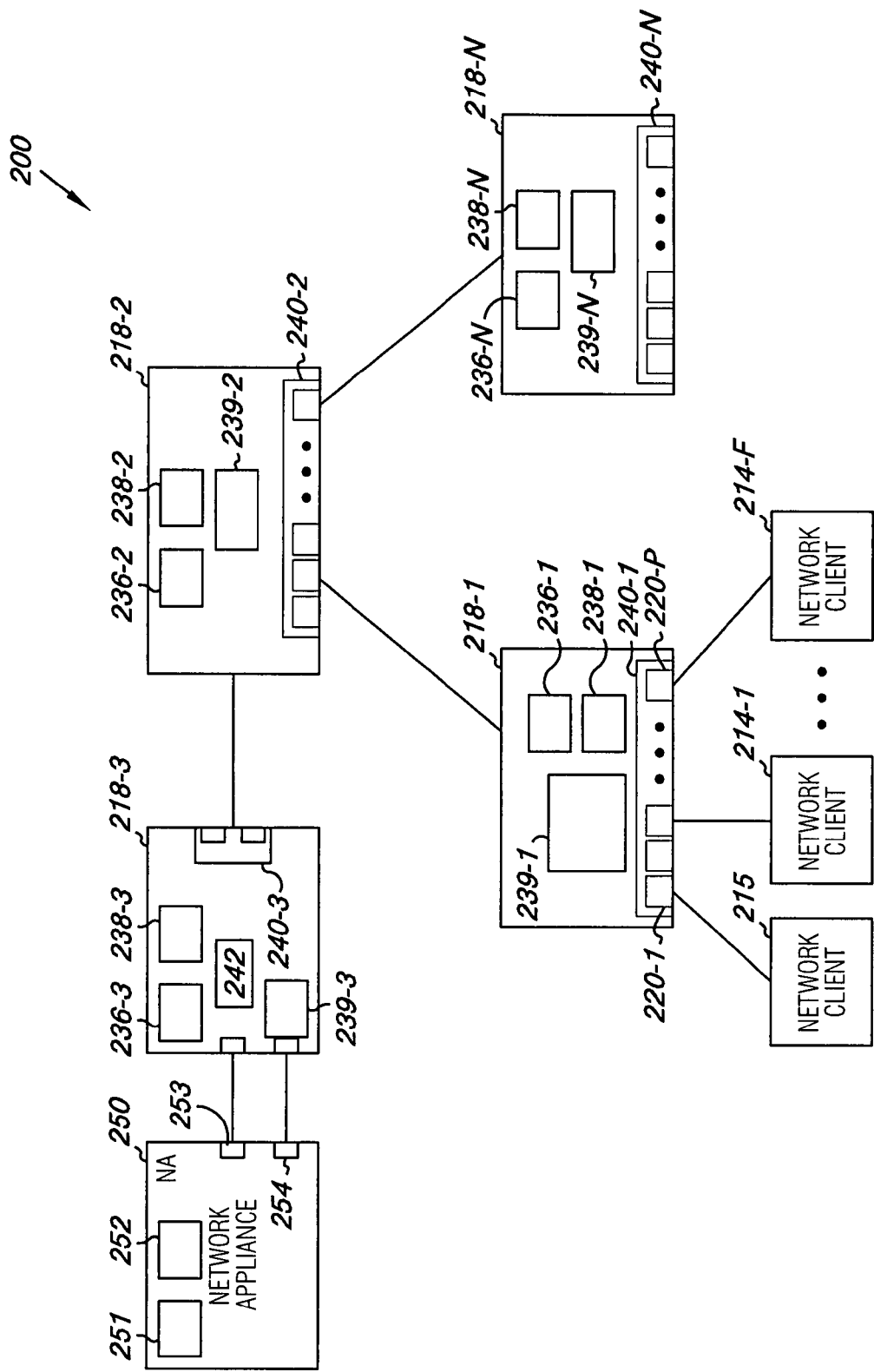
FIG. 2 illustrates an embodiment of an intrusion system in a network.

FIG. 2 illustrates a portion 200 of a network, e.g., network 100 shown in FIG. 1, including embodiments of various network devices, 218-1, 218-2, . . . 218-N suited to implement techniques of the present disclosure. By way of illustration and not by way of limitation, various network devices can be considered "edge network devices", e.g., 218-1 and 218-N, meaning they have ports connected directly to network clients, 215 and 214-1, . . . 214-F. For example, the edge network devices, 218-1 and 218-N, can represent the network devices 118-1 and 118-2 shown in FIG. 1. The network clients can include "fat" and "thin" clients as discussed above in connection with FIG. 1. Additionally, by way of illustration and not by way of limitation, various network devices can be considered "central network devices", e.g., 218-2 and 218-3, meaning they may be connected to other network devices, e.g., 218-2 and 218-3, but might not be connected directly to network clients, e.g., 215 and 214-1, . . . 214-F. For example central network device 218-3 in FIG. 2 can represent a network management server, e.g., 112 in FIG. 1, a router, e.g., 116 in FIG. 1, etc. As the reader will appreciate, a network management server 218-3 may include a threat management engine (TME) 242, e.g., application module.

As described in connection with FIG. 1, the various network devices, 218-1, 218-2, . . . 218-N, can include switches, routers, hubs, servers, etc. Each network device, 218-1, 218-2, . . . 218-N, can include processor, 236-1, . . . , 236-N, and memory, 238-1, . . . , 238-N, resources. The network devices, 218-1, 218-2, . . . 218-N, can similarly include a number of network chips, e.g., 240-1, . . . , 240-N, including logic circuitry (hardware) which can execute instructions. As used herein, a "network chip" includes hardware in the form of logic/circuitry, e.g., transistor gates in an application specific integrated circuit (ASIC), which can execute instructions to perform a particular task. Each network chip, 240-1, . . . , 240-N, can include a number of network ports, 220-1, 220-2, . . . , 220-P to send and receive data packets (network traffic) throughout the network 200. The logic circuitry of a network chip, 240-1, . . . , 240-N, includes logic to serve as link logic control (LLC) and media access control (MAC), as the same will be known and understood by one of ordinary skill in the art.

As the reader will appreciate, the number of ports 220-1, 220-2, . . . , 220-P on a network chip 240-1, . . . , 240-N will access the logic circuitry of the chip 240-1, . . . , 240-N and have access to the processor 236-1, . . . , 236-N and memory 238-1, . . . , 238-N resources on a given network device, e.g., 218-1, . . . , 218-N, through a crossbar, crosslink, and/or switching fabric 239-1, . . . , 239-N as the same will be understood by one of ordinary skill in the art. As used herein, the designators "N", "F" and "P" are used to illustrate that various networks can have a various number of network devices, various numbers of network clients, and various network devices in a network may support or contain a various and/or different number of ports. Embodiments are not limited to the example shown in FIG. 2.

As shown in the embodiment of FIG. 2, a network appliance 250 can be connected to a central network device, e.g., 218-3. As used herein, the term "network appliance" means an add-on, e.g., "plug-in", device to a network 200 as contrasted with a "network device", e.g., router, switch, server, and/or hub, etc., which serves more as a "backbone" component to a network. As shown in FIG. 2, the network appliance 250 can includes processor 251 and memory 252 resources capable of storing and executing instructions to perform a particular role or function.

In various embodiments, the network appliance 250 is an intrusion prevention system (IPS), as may be supplied by a third party vendor of network security devices. In various embodiments, the network appliance 250 can be an intrusion detections system (IDS), another diagnostic device, an accounting device, a counting device, e.g., analysis tool, etc., as may be supplied by a third party vendor. As the reader will appreciate various behavior analysis tools are known in the art as available from third party vendors, which may compare data packets to expected and/or acceptable format, qualities, and/or function. More detail is not provided here so as not to obscure embodiments of the present invention. The various operations of such devices will be recognized and understood by one of ordinary skill in the art.

As noted, FIG. 2 illustrates an embodiment of a portion of a network 200 including edge network devices 218-1/218-N (e.g., "first network devices"), where each edge network device, 218-1/218-N, includes multiple ports, 220-1, . . . , 220-P. The network 200 also includes a central network device such as a network management server 218-3 (e.g., "second network device") that can connect with the edge network devices 218-1/218-N over the network, such as the network 100 shown in FIG. 1. As shown in the embodiment of FIG. 2, network device 218-3 can be associated with an IS, shown as network appliance 250.

As shown in FIG. 2, each of the edge network devices 218-1/218-N, and IS network appliance 250 may include ports 220-1, . . . , 220-P, and 253/254, respectively. In the various embodiments, the ports 220-1, . . . , 220-P on the network devices 218-1/218-N can be used to connect packets between devices on the network 200. Ports 253/254 can be used to receive packets that are either copied and forwarded from and/or stolen (as described in more detail below) from ports, 220-1, . . . , 220-P on network devices, 218-1/218-N, for analysis as described above.

In the embodiment of FIG. 2, network device 218-3, e.g., network management server 112 in FIG. 1, includes a TME 242 (application module) having instructions which can execute to receive an alert signal about a data traffic anomaly (or anomalies) occurring on a network device, e.g., 218-1/218-N, identify a particular port, 220-1, . . . , 220-P, among the numerous ports on the network device in which the data traffic anomaly is occurring, and signal the particular network device, 218-1/218-N, to reconfigure the particular port, 220-1, . . . , 220-P, to send data packets to an IS, e.g., network appliance 250.

As the reader will appreciate, data traffic moving through the ports, 220-1, . . . , 220-P of various network devices, e.g., edge network devices 218-1/218-N, may be monitored for an occurrence of data traffic of interest, e.g., data traffic anomalies, which are communicated to a network management application of a network management server 218-3. For example, as will be appreciated by one of ordinary skill in the art, a management information base (MIB) storable within memory on a given network device may regularly send information, e.g., data, to a network management server application executing on a network management server, e.g., 218-3. Such information includes data concerning various status of a given network device, e.g., processor and/or memory usage/availability, link status of a port ("up" or "down"), port transmissions, port receipts, etc. Such MIB information can be regularly sent to the network management application of the network management server 218-3 in the form of "traps", e.g., data reports in simple network management protocol (SNMP), as the same will be known and understood by one of ordinary skill in the art. Alternatively, a network management application may poll the MIB, using SNMP requests, to retrieve such information from the MIB. Embodiments are not limited to these examples of receiving information to a network management application regarding data traffic anomalies on a particular port of a given network device.

A network management application on a network management server, can execute instructions to process packet traffic information, e.g., received with MIB information, for a particular network device, and when data traffic anomalies are discovered trigger an alert signal to a TME, e.g., TME application module 242 in network management server 218-3. Examples of data traffic anomalies can include a rapid or uncharacteristic increase in the amount of data traffic through a particular network device and/or port, a large amount of data traffic moving through a particular network device and/or port, etc., or other unusual data flow behavior through a particular network device and/or port. For example, unusual behavior reported by the traps sent to the network management application can be used to generate an alert signal to the TME 242 to indicate a data traffic anomaly occurring on a given network device, 218-1/218-N. While the TME 242 in the embodiment of FIG. 2 is illustrated within a network management server 218-3, the reader will appreciate that the TME may be located elsewhere on another network device.

As the reader will appreciate, the TME executes instructions to act on receipt of such an alert signal. Instructions associated with the TME can execute to request that a particular network device, 218-1/218-N, identify which particular port(s), 220-1, . . . , 220-P, are experiencing the data traffic anomaly. According to embodiments, software and/or logic on the edge network devices, 218-1/218-N, execute upon receipt of the request from the TME to identify the particular port(s) experiencing the data traffic anomaly to the TME. The software and/or logic then executes instructions to reconfigure those port(s), 220-1, . . . , 220-P, to forward original data packets (e.g., stealing packets) to a location, e.g., network device 218-3, having access to the IS 250. In an alternate embodiment, software and/or logic executes instructions to instead copy (e.g., mirroring) the original data packets and to forward the copies of the original data packets to the location, 218-3, having access to the IS 250.

In some embodiments, instructions on the particular network device 218-1/218-N, execute to reconfigure a given port, 220-1, . . . , 220-P, which is experiencing the data traffic anomaly on the network device, 218-1/218-N, to send originals or copies of all data packets received by the given port, 220-1, . . . , 220-P, to the location, 218-3, having access to the IS 250. One of ordinary skill in the art will appreciate the manner in which instructions on a particular network device 218-1/218-N can execute instructions to forward original or copied data packet to a new location 218-3 different from an original destination address of the received packet. For example, instructions can execute to assign a new destination address, e.g., MAC address, to the destination header information of the re-routed original and/or copies of the packets of interest so that these packets will be directed to the network device, 218-3, having the network appliance 250, e.g., IPS and/or IDS, attached thereto.

In alternate embodiments, instructions on the particular network device 218-1/218-N execute to reconfigure the given port, 220-1, . . . , 220-P, which is experiencing the data traffic of interest to send only originals or copies of data packets received to the given port, 220-1, . . . , 220-P, which match a particular access control list (ACL) rule. The ACL rule could include a layer 3 IP flow in order to only send data packets associated with one or more particular IP flows. As the reader will appreciate, an IP flow means a flow of data packets between a particular source IP address and a particular destination IP address. The ACL rule could include a layer 3 protocol as identified in the header information of a data packet. The ACL rule could also include a layer 4 port number, etc. This capability thus provides the ability to select data packets of interest from just one network client connected to the edge network device. This is helpful where the data packets of interest may be just one of millions of IP flows on the given port, 220-1, . . . , 220-P.

Once the data packets are received to the location, 218-3, having access to the IS 250, the data packets of interest can be monitored and analyzed. For example, where the location 218-3 is a network management server, 218-3 having a network management application thereon, instructions associated with the network management application can execute to examine the data packets of interest and can execute to share the data packets of interest, e.g., suspicious packets, with the network appliance, e.g., IS, 250. As described above, the network appliance 250 may include various analysis tools and may include an IS 250 which can execute instructions to drop packets and/or initiate a remedial action on the network. One of ordinary skill in the art will appreciate the manner in which an IS may drop (e.g., discard) a suspicious packet and/or initiate a remedial action. Although the embodiment of FIG. 2 illustrates the IS 250 as a separate network appliance, the reader will appreciate that the IS, or other analysis tool may local to network device 218-3.

Figure 3:
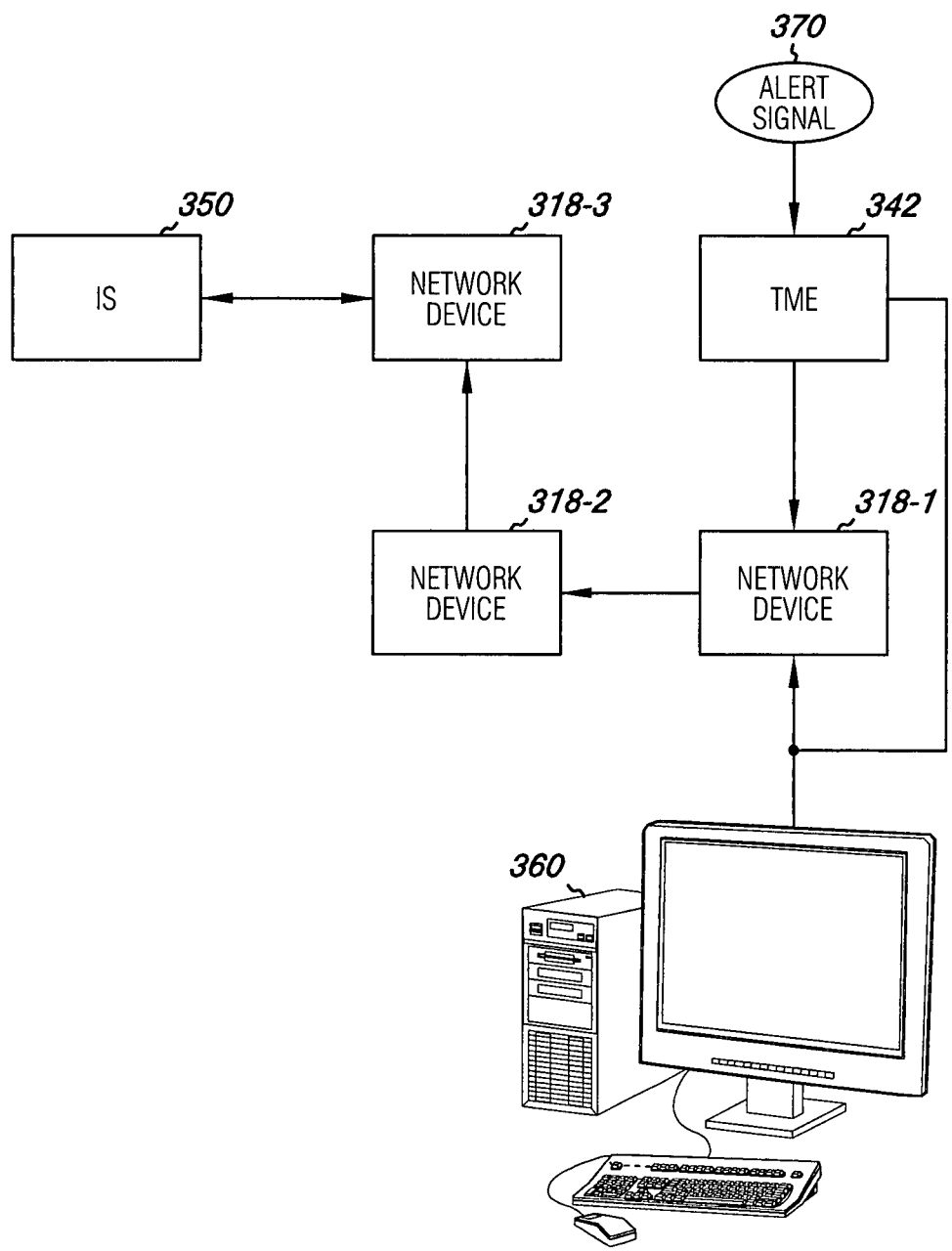
FIG. 3 illustrates another embodiment of an intrusion system in a network.

FIG. 3 illustrates an embodiment of a portion of a network including an edge network device 318-1 which can include multiple ports as the same has been described herein. The portion of the network illustrates a user 360 that connects to the network through a port on an edge network device 318-1. According to embodiments described herein the network further includes a second network device 318-3 having access to an IS 350.

As discussed herein, data traffic moving through the ports of the edge network device 318-1 is monitored for an occurrence of data traffic anomalies. When suspicious activity is detected, an alert signal 370 is issued, e.g., by a network management application on a network management server (112 in FIG. 1) to a threat mitigation engine (TME) 342, e.g., an application module located local to the network management server or elsewhere on the network. The TME 342 executes instructions to send a request to the edge network device 318-1 to identify a particular port(s) on the edge network device 318-1 experiencing the data traffic anomaly and to cause instructions on the network device 318-1 to reconfigure the port(s) experiencing data traffic anomalies according to the techniques described herein. According to embodiments, a reconfigured port(s) experiencing the anomaly will send copies of the data packets and/or the original data packets to the intrusion system (IS) 350 associated with a second network device 318-3. The data traffic from the particular port can then be monitored and analyzed by the IS 350 and appropriate action can be taken based on the results of the analysis. As the reader will appreciate, data packets forwarded to the IS 350 and second network device 318-3 may pass through one or more additional network devices, e.g., 318-2.

It is to be understood that the above description has been made in an illustrative fashion, and not a restrictive one. Although particular embodiments have been illustrated and described herein, those of ordinary skill in the art will appreciate that other component arrangements and device logic can be substituted for the particular embodiments shown. This claims are intended to cover such adaptations or variations of various embodiments of the disclosure, except to the extent limited by the prior art.

In the foregoing Detailed Description, various features are grouped together in a single embodiment for the purpose of streamlining the disclosure. This method of disclosure is not to be interpreted as reflecting an intention that any claim requires more features than are expressly recited in the claim. Rather, as the following claims reflect, inventive subject matter lies in less than all features of a single disclosed embodiment. Thus, the following claims are hereby incorporated into the Detailed Description, with each claim standing on its own as a separate embodiment of the invention.

What is claimed is:

1. A network device, comprising:
   a processor;
   a memory in communication with the processor;
   a network chip having a number of network ports for the network device and having access to the processor and memory; and
   computer executable instructions storable in the memory and executable by the processor to receive instructions from a threat mitigation engine (TME) in response to the TME detecting suspicious data traffic at the network device,
   wherein the instructions received from the TME are to instruct the network device to identify a particular port among the number of network ports of the network device as having the suspicious data traffic and to provide data packets from the particular port of the network device to an intrusion system (IS) on a second network device to allow the IS to determine whether an actual data traffic anomaly is occurring at the particular port of the network device, and
   wherein the TME is on a server.

2. The network device of claim 1, where the computer executable instructions provide a copy of the data packets from the particular port to the IS.

3. The network device of claim 1, where the computer executable instructions redirect the data packets from the particular port to the IS.

4. The network device of claim 1, wherein the network ports of the network device are monitored for an occurrence of the suspicious data traffic.

5. The network device of claim 4, wherein the TME is to receive an alert signal based on the occurrence of the suspicious data traffic at the network device.

6. The network device of claim 1, wherein the computer executable instructions storable in the memory and executable by the processor send alert information to the TME about the suspicious data traffic at the network device.

7. The network device of claim 1, wherein the computer executable instructions storable in the memory and executable by the processor send a sample of a data flow through the network ports of the network device to the TME from which the suspicious data traffic is determined by the TME.

8. A threat mitigation engine, comprising:
   a processor;
   a memory in communication with the processor;
   a network chip having access to the processor and memory; and
   computer executable instructions stored in the memory and executable by the processor to receive an alert signal about suspicious data traffic at a network device, to request the network device to identify a particular port among a number of physical ports in the network device as having the suspicious data traffic, and to cause the network device to forward data packets from the particular port of the network device to an intrusion system (IS) on a second network device to allow the IS to determine whether an actual data traffic anomaly is occurring at the particular port of the network device,
   wherein the TME is on a server.

9. The threat mitigation engine of claim 8, wherein a behavior analysis tool indicates that the suspicious data traffic is occurring at the network device and provides the alert signal to the threat mitigation engine.

10. The treat mitigation engine of claim 8, wherein the threat mitigation engine receives event information from the network device for the alert signal about the suspicious data traffic at the network device.

11. The threat mitigation engine of claim 8, wherein the threat mitigation engine receives a sample of data traffic through the network device.

12. The threat mitigation engine of claim 8, wherein the computer executable instructions stored in the memory and executable by the processor include instructions to cause the network device to forward data packets from the particular port to the intrusion system (IS) on the second network device.

13. The threat mitigation engine of claim 12, wherein the instructions to cause the network device includes instructions to cause the network device to forward a copy of the data packets from the particular port to the IS.

14. The threat mitigation engine of claim 12, wherein the instructions to cause the network device includes instructions to cause the network device to redirect the data packets from the particular port to the IS.

15. A method comprising:
   receiving, at a threat mitigation engine (TME), an alert signal about suspicious data traffic at a network device;
   sending computer readable instructions from the TME to the network device to instruct the network device to identify a particular port among a number of physical ports in the network device as having the suspicious data;
   receiving, at the TME, the identification of the particular port from the network device; and
   instructing the network device to forward data packets from the particular port to an intrusion system (IS) located on a second network device to allow the IS to determine whether an actual data traffic anomaly is occurring at the particular port of the network device,
   wherein the TME is on a server.

16. The method of claim 15, wherein receiving the alert signal includes receiving trap information from the network device as the alert signal about the suspicious data traffic at the network device.

17. The method of claim 15, where receiving the alert signal includes receiving a sample of data packets from the network device with the alert signal about the suspicious data traffic at the network device.

18. The method of claim 15, wherein instructing the network device to forward data packets includes instructing the network device to send a copy of the data packets from the particular port to the IS located on the second network device.

19. The method of claim 15, wherein instructing the network device to forward data packets includes instructing the network device to redirect the data packets from the particular port to the IS located on the second network device.

20. The method of claim 15, where the method includes executing instructions to monitor the physical ports of the network device for suspicious data traffic.

\* \* \* \* \*

UNITED STATES PATENT AND TRADEMARK OFFICE
CERTIFICATE OF CORRECTION

PATENT NO. : 8,910,275 B2
APPLICATION NO. : 11/705963
DATED : December 9, 2014
INVENTOR(S) : Sajeev Madhavan et al.

It is certified that error appears in the above-identified patent and that said Letters Patent is hereby corrected as shown below:

In the Claims

In column 10, line 27, in Claim 10, delete "treat" and insert -- threat --, therefor.

In column 10, line 55, in Claim 15, delete "data;" and insert -- data traffic; --, therefor.

Signed and Sealed this
Twelfth Day of May, 2015

Michelle K. Lee
*Director of the United States Patent and Trademark Office*